United States Patent
Royyuru et al.

(10) Patent No.: US 10,089,617 B2
(45) Date of Patent: Oct. 2, 2018

(54) SYSTEMS AND METHODS FOR FACILITATING CARD PRESENT TRANSACTIONS

(71) Applicant: First Data Corporation, Greenwood Village, CO (US)

(72) Inventors: Vijay Kumar Royyuru, Norristown, PA (US); Todd Nuzum, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1216 days.

(21) Appl. No.: 13/627,670

(22) Filed: Sep. 26, 2012

(65) Prior Publication Data

US 2013/0080329 A1   Mar. 28, 2013

Related U.S. Application Data

(60) Provisional application No. 61/539,206, filed on Sep. 26, 2011.

(51) Int. Cl.
| | |
|---|---|
| *G06Q 40/00* | (2012.01) |
| *G06Q 20/32* | (2012.01) |
| *G06Q 30/00* | (2012.01) |
| *G06Q 40/02* | (2012.01) |
| *G06Q 20/40* | (2012.01) |

(52) U.S. Cl.
CPC ....... *G06Q 20/3278* (2013.01); *G06Q 20/405* (2013.01); *G06Q 30/00* (2013.01); *G06Q 40/02* (2013.01)

(58) Field of Classification Search
CPC .................................................. G06Q 40/00

USPC ......................................................... 705/35
See application file for complete search history.

(56) References Cited

U.S. PATENT DOCUMENTS

| | | |
|---|---|---|
| 5,566,327 A | 10/1996 | Sehr |
| 6,505,772 B1 | 1/2003 | Mollett et al. |
| 7,099,850 B1 * | 8/2006 | Mann, II ............... G06Q 20/16 380/28 |
| 7,119,659 B2 | 10/2006 | Bonalle et al. |

(Continued)

OTHER PUBLICATIONS

Notice of Allowance for U.S. Appl. No. 13/627,665 dated May 9, 2014.

(Continued)

*Primary Examiner* — Kirsten S Apple
(74) *Attorney, Agent, or Firm* — Eversheds-Sutherland (US) LLP (57) ABSTRACT

Embodiments of the disclosure can include systems and methods for facilitating card present transactions. In one embodiment, a computer-implemented method for conducting card present transactions can be provided. The method can include receiving, by a merchant system comprising one or more computers, a request for a card present electronic commerce transaction on behalf of a consumer; determining, by the merchant system, an identifier of a mobile device of the consumer; obtaining, by the merchant system from the mobile device, validation information associated with a payment application stored on the mobile device; and outputting, by the merchant system for communication to an issuer system, a proposed card present transaction and the validation information.

13 Claims, 3 Drawing Sheets

(56) References Cited

U.S. PATENT DOCUMENTS

| | | | |
|---|---|---|---|
| 7,689,508 B2* | 3/2010 | Davis | G06Q 20/10 455/406 |
| 8,332,272 B2 | 12/2012 | Fisher | |
| 8,452,654 B1* | 5/2013 | Wooters | G06Q 30/0234 705/14.34 |
| 8,485,441 B2 | 7/2013 | Brooks | |
| 8,583,549 B1* | 11/2013 | Mohsenzadeh | G06Q 20/227 705/38 |
| 8,606,640 B2* | 12/2013 | Brody | G06Q 20/0655 705/26.1 |
| 8,688,604 B2 | 4/2014 | Royyuru | |
| 2002/0062249 A1 | 5/2002 | Iannacci | |
| 2004/0015435 A1 | 1/2004 | Solomon et al. | |
| 2004/0049452 A1 | 3/2004 | Blagg | |
| 2004/0122685 A1* | 6/2004 | Bunce | G06Q 20/04 705/67 |
| 2005/0077350 A1 | 4/2005 | Courtion et al. | |
| 2005/0250538 A1* | 11/2005 | Narasimhan | G06Q 20/12 455/558 |
| 2006/0000900 A1 | 1/2006 | Fernandes et al. | |
| 2006/0208060 A1 | 9/2006 | Mendelovich et al. | |
| 2006/0208065 A1* | 9/2006 | Mendelovich | G06Q 20/04 235/380 |
| 2006/0229974 A1 | 10/2006 | Keithley et al. | |
| 2006/0242046 A1 | 10/2006 | Haggerty et al. | |
| 2007/0203832 A1 | 8/2007 | Babi et al. | |
| 2007/0255564 A1* | 11/2007 | Yee | G10L 17/24 704/246 |
| 2008/0203153 A1 | 8/2008 | Keithley et al. | |
| 2008/0208760 A1 | 8/2008 | Keithley | |
| 2009/0144165 A1 | 3/2009 | Dickelman | |
| 2009/0164320 A1 | 6/2009 | Galit | |
| 2010/0070354 A1 | 3/2010 | Fordyce et al. | |
| 2010/0191570 A1* | 7/2010 | Michaud | G06Q 30/02 705/7.33 |
| 2010/0205091 A1* | 8/2010 | Graziano | G06Q 20/102 705/40 |
| 2011/0078081 A1 | 3/2011 | Pirzadeh et al. | |
| 2011/0201306 A1* | 8/2011 | Ali Al-Harbi | G06F 21/42 455/411 |
| 2012/0109764 A1 | 5/2012 | Khan et al. | |
| 2012/0143703 A1 | 6/2012 | Wall et al. | |
| 2012/0271712 A1* | 10/2012 | Katzin | G06Q 30/06 705/14.51 |
| 2012/0296770 A1 | 11/2012 | Lin et al. | |
| 2013/0030934 A1* | 1/2013 | Bakshi | G06Q 20/40 705/18 |
| 2013/0040571 A1 | 2/2013 | Wall et al. | |
| 2013/0046643 A1 | 2/2013 | Wall et al. | |
| 2013/0080219 A1 | 3/2013 | Royyuru | |
| 2013/0080236 A1 | 3/2013 | Royyuru | |
| 2013/0080239 A1 | 3/2013 | Okerlund | |
| 2013/0080273 A1 | 3/2013 | Royyuru | |
| 2013/0080328 A1 | 3/2013 | Royyuru | |
| 2014/0164082 A1* | 6/2014 | Sun | G06Q 30/0214 705/14.16 |
| 2014/0244365 A1* | 8/2014 | Price | G07B 15/00 705/13 |
| 2015/0220924 A1* | 8/2015 | Bakker | G06Q 20/4014 705/14.27 |

OTHER PUBLICATIONS

Final Office Action for U.S. Appl. No. 13/627,654 dated Sep. 9, 2013.

Final Office Action for U.S. Appl. No. 13/627,665 dated Aug. 7, 2013.

DigiMo Pioneers First True Mobile Payment Solution, M2 Presswire, NA, May 5, 2011.

Notice of Allowance for U.S. Appl. No. 13/627,665 dated Oct. 25, 2013.

Non-final Office Action for U.S. Appl. No. 13/627,665 dated Mar. 15, 2013.

Non-final Office Action for U.S. Appl. No. 13/627,654 dated Apr. 2, 2013.

Non-Final Office Action for U.S. Appl. No. 13/627,654 dated Jan. 2, 2014.

Non-final Office Action response for U.S. Appl. No. 13/627,665 dated Jun. 17, 2013.

Non-final Office Action response for U.S. Appl. No. 13/627,654 dated Jul. 1, 2013.

Final Office Action response for U.S. Appl. No. 13/627,665 dated Oct. 14, 2013.

Final Office Action response for U.S. Appl. No. 13/627,654 dated Nov. 11, 2013.

Non-Final Office Action response for U.S. Appl. No. 13/627,654 dated Mar. 3, 2014.

* cited by examiner

SYSTEMS AND METHODS FOR FACILITATING CARD PRESENT TRANSACTIONS

RELATED APPLICATION

This application claims priority to U.S. Ser. No. 61/539,206, titled "Systems and Methods for Processing Payment Transactions," filed on Sep. 26, 2011, the contents of which are incorporated herein by reference.

FIELD OF THE INVENTION

Embodiments of the invention relate generally to electronic commerce transactions, and more specifically to the facilitation of card present electronic commerce transactions.

BACKGROUND OF THE INVENTION

A wide variety of electronic commerce "eCommerce" payment transactions are performed via the Internet. In a typical eCommerce transaction, a consumer utilizes a personal computer to access one or more merchant Web sites, and the consumer selects products to be purchased. During a checkout proceeding, the consumer provides payment account information, such as a credit card or debit card number, to a merchant system. The merchant system then generates a payment authorization request utilizing the payment account information, and the payment authorization request is communicated to a payment account issuer for processing.

Conventional eCommerce payment transactions are considered "card not present" ("CNP") transactions because a physical payment device (e.g., a payment card) has not been read by the merchant. Accordingly, a higher level of risk may be attributed to the transactions, thereby leading to increased pricing and/or liability concerns. However, with the increasing use of new payment devices, such as transaction-enabled mobile devices, there is an opportunity for improved system and methods that facilitate card present eCommerce transactions.

SUMMARY

Embodiments of the disclosure can include systems and methods for facilitating card present transactions. Certain embodiments of the disclosure can facilitate card present electronic commerce transactions. In one embodiment, a computer-implemented method for conducting card present transactions can be provided. The method can include receiving, by a merchant system comprising one or more computers, a request for a card present electronic commerce transaction on behalf of a consumer; determining, by the merchant system, an identifier of a mobile device of the consumer; obtaining, by the merchant system from the mobile device, validation information associated with a payment application stored on the mobile device; and outputting, by the merchant system for communication to an issuer system, a proposed card present transaction and the validation information.

In one aspect of an embodiment, determining an identifier of a mobile device can include determining a mobile telephone number.

In one aspect of an embodiment, obtaining validation information can include obtaining information derived from a mobile personal identification number stored on the mobile device.

In another embodiment, a computer-implemented method for conducting card present transactions can be provided. The method can include receiving, by a merchant system comprising one or more computers, a request for a card present electronic commerce transaction on behalf of a consumer; determining, by a consumer mobile device, an identifier for the merchant system and transaction; obtaining, by the merchant system from the mobile device, validation information associated with a payment application stored on the mobile device; and outputting, by the merchant system for communication to an issuer system, a proposed card present transaction and the validation information.

In yet another embodiment, a computer-implemented method for conducting card present transactions can be provided. The method can include receiving, by a merchant system comprising one or more computers, a request for a card present electronic commerce transaction on behalf of a consumer; determining, by a service provider system; a consumer mobile device identifier, the merchant system, and transaction; obtaining, by the merchant system from the mobile device, validation information associated with a payment application stored on the mobile device; and outputting, by the merchant system for communication to an issuer system, a proposed card present transaction and the validation information.

DETAILED DESCRIPTION OF THE INVENTION

Various embodiments of the invention are directed to systems and methods for facilitating card present eCommerce transactions. In certain embodiments, one or more secure payment applications may be provisioned to a consumer device, such as a consumer mobile device, and the one or more applications may facilitate card present eCommerce transactions. For example, during an online purchase, a consumer may provide a merchant with identification information for a mobile device (e.g., a mobile telephone number, etc.), thereby facilitating communication with the mobile device in order to obtain card present information, such as security and/or validation data. The use of the card present information may then be provided to a payment account issuer in order to facilitate completion of a card present eCommerce transaction. In this regard, the merchant may receive more favorable transaction processing terms than those associated with typical eCommerce transactions. For example, the merchant may not be charged a card not present fee from an issuer. In another example, the consumer may receive transaction identification information from the merchant (e.g. by reading a transaction ID from the merchant's website and entering that on the consumer's mobile device, such as a smartphone, or by scanning a bar code image of that ID from the merchant website using the mobile device, such as a smartphone camera), then facilitating a communication from the consumer's mobile device to the merchant using that transaction ID. In yet another example, both the consumer's mobile device and the merchant system may interact with a "meet in the middle"-type service to complete the transaction.

In one example embodiment of the invention, during the activation of a payment application and/or during the registration of a payment application or mobile device with a service provider (e.g., a trusted service manager or other service provider that facilitates a wide variety of payment transaction services) and/or a payment account issuer (e.g., a credit card issuer, a debit card issuer, etc.), a consumer (i.e., a user of the mobile device) may be prompted to provide security data, such as a mobile personal identification number ("mPIN"). The mPIN may be stored on the mobile device, for example, in a secure element of the mobile device. Additionally, the mPIN may be provided to the card issuer (and/or the service provider).

Subsequently, the consumer may utilize a suitable consumer device (e.g., the mobile device, a personal computer, etc.) to request an eCommerce transaction. The eCommerce transaction may be identified as a card present transaction either via processing of mobile device identification information (e.g., a mobile telephone number or other identifier provided by the consumer or the mobile device to a merchant system or service provider, or transaction identifier provided by the merchant eCommerce system to the consumer's mobile device, such as a smartphone, or use of a "meet in the middle"-type service by both merchant eCommerce system and consumer's mobile device). A suitable wallet or payment application may then be invoked on the mobile device by the merchant or by a suitable service provider, and validation and/or security information (e.g., the mPIN, an encrypted communication including the mPIN, etc.) may be received from the mobile device. As desired, the consumer may be prompted by the mobile device for the mPIN prior to validation information being accessed from the secure element for communication. The validation information may then be submitted by the merchant system (or service provider) to the payment account issuer in conjunction with an authorization request for the eCommerce transaction. In this regard, the validation information may be verified by the issuer utilizing the previously received registration information. As a result, strong dynamic two-factor authorization may be achieved by the issuer. For example, the issuer may be able to verify both that the consumer was able to access the secure element and that the information obtained from the secure element is correct.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

System Overview

Figure 1:
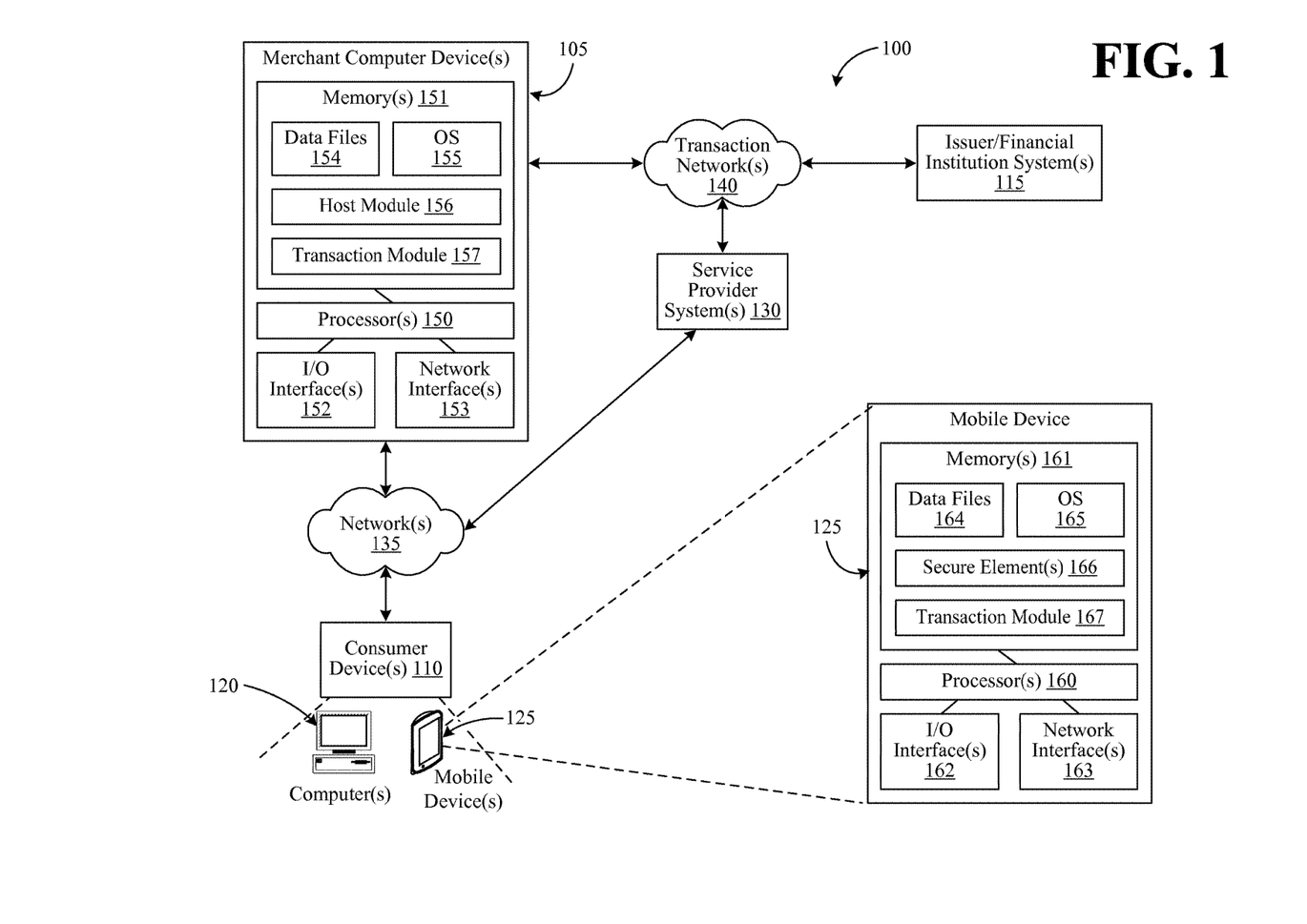
FIG. 1 illustrates a block diagram of an example system that may be utilized in accordance with various embodiments of the invention.

FIG. 1 represents a block diagram of an example system 100 for facilitating card present eCommerce transactions, according to one embodiment of the invention. In certain embodiments, the system 100 may facilitate interaction with a consumer mobile device in order to process eCommerce transactions as card present transactions. As shown in FIG. 1, the system 100 may include one or more merchant computers and/or merchant devices 105, one or more consumer devices 110, and one or more issuer or financial institution systems 115. A wide variety of different types of consumer devices 110 may be provided, such as consumer computers 120 and/or mobile devices 125. As desired, the system 100 may include a wide variety of other entities associated with payment transactions, such as one or more service provider computers 130. Any number of suitable networks and/or communication channels, such as the illustrated networks 135, 140, may facilitate communication between various components of the system 100.

With reference to FIG. 1, any number of merchant computers and/or merchant devices 105 may be provided. In certain embodiments, these merchant devices may include one or more eCommerce devices, such as one or more Web servers and/or associated systems that facilitate eCommerce transactions. As desired, each merchant device may include any number of processor-driven devices, including but not limited to, a server computer, a mainframe computer, one or more networked computers, a desktop computer, a personal computer, a laptop computer, a mobile computer, an application-specific circuit, or any other processor-based device.

A merchant computer 105 may be any suitable device that facilitates eCommerce transactions. In operation, the merchant computer 105 may utilize one or more processors 150 to execute computer-readable instructions that facilitate the hosting of one or more eCommerce services (e.g., the hosting of one or more eCommerce Web sites), the receipt of purchase transaction requests, and/or the processing of eCommerce transactions. As a result of executing these computer-readable instructions, a special purpose computer or particular machine may be formed that facilitates the eCommerce transactions, including card present eCommerce transactions.

In addition to having one or more processors 150, the merchant computer 105 may further include and/or be associated with one or more memory devices 151, input/output ("I/O") interface(s) 152, and/or network interface(s) 153. The memory 151 may be any computer-readable medium, coupled to the processor(s) 150, such as random access memory ("RAM"), read-only memory ("ROM"), and/or a removable storage devices. The memory 151 may store a wide variety of data files 154 and/or various program modules, such as an operating system ("OS") 155, one or more host modules 156, and/or one or more transaction modules or transaction applications 157. The data files 154 may include any suitable data that facilitates the operation of the merchant computer 105 and/or interaction of the merchant computer 105 with one or more other components (e.g., one or more consumer devices 110, one or more service provider systems 130, one or more merchant acquiring platforms, one or more issuer systems 115, etc.) of the system 100. For example, the data files 154 may include information associated with eCommerce Web pages, inventory information associated with available products, acquiring platform information, service provider information, information associated with the generation of proposed eCommerce transactions and/or routing information for proposed transactions.

The OS 155 may be a suitable module that facilitates the general operation of the merchant computer 105, as well as the execution of other program modules. For example, the OS 155 may be, but is not limited to, Microsoft Windows®, Apple OSX™, Unix, a mainframe computer operating system (e.g., IBM z/OS, MVS, OS/390, etc.), or a specially designed operating system. The host modules 156 may include any number of suitable host modules that manage interactions and communications between the merchant computer 105 and external devices, such as the consumer devices 110. For example, the host modules 156 may include one or more Web server modules that facilitate the hosting of merchant Web pages and/or transaction processing Web pages. As another example, the host modules 156 may include one or more cellular modules and/or systems that facilitate cellular communication with one or more mobile devices 125.

The transaction modules or applications 157 may include any number of suitable software modules and/or applications that facilitate the collection and/or processing of information association with an eCommerce transaction, such as one or more identifiers of desired products (e.g., UPC identifiers) and/or services, a desired payment account, a desired type of transaction (e.g., a card present transaction, a card not present transaction, etc.), consumer identification information, and/or an identifier of a consumer device 110 (e.g., a mobile device identifier, etc.). Based at least in part upon the collected information, the transaction module 157 may generate and/or communicate a wide variety of transaction-related requests, such as payment processing and/or authorization requests and/or requests for one or more value added services ("VAS").

In one example embodiment, a transaction module 157 may receive a request for an eCommerce transaction (e.g., a request provided via a Web page, etc.). As desired, the transaction module 157 may identify available payment options that are presented to a consumer (e.g., credit account payment options, debit account payment options, stored value account payment options, card present eCommerce payment options, etc.), and a consumer selection of a payment option may be received. In the event that a card present transaction is requested, the transaction module 157 may obtain a mobile device identifier, for example, via an established communications session with a consumer's mobile device 125 or in response to requesting the mobile device identifier from the consumer. The transaction module 157 may then invoke or request that a service provider system 130 invoke one or more suitable applications on the mobile device 125 (e.g., a wallet application, a transaction module, etc.) in order to receive validation information from the mobile device 125, such as an mPIN and/or a message (e.g., an encrypted message, etc.) derived from an mPIN and/or other information (e.g., a secure element identifier, an encryption key, etc.). In another embodiment, the connectivity of the transaction module 157 and the mobile device 125 may also be established in other ways such as: a) Transaction module 157 displays a transaction ID (e.g. in text or as a bar code) and the mobile device 125 is used to capture that identifier and communicate validation information back from the mobile device 125 to the transaction module 157 via the service provider system 130; b) Both transaction module 157 and mobile device 125 use the service provider system 130 as a "meet in the middle"-type service to connect the mobile device with the corresponding transaction for conveyance of the validation information. The transaction module 157 (or service provider system 130) may then associate the validation information with a proposed transaction that is output for communication to an issuer system 115 associated with a selected payment account. For example, the transaction module 157 may append and/or incorporate the validation information into a transaction authorization and/or settlement request. In this regard, the issuer system 115 may verify the validation information and determine whether a card present eCommerce transaction will be allowed.

As desired, prior to the output of a proposed transaction, the transaction module 157 may invoke and/or request (e.g., request a service provider system 130, etc.) the invocation of a wide variety of VAS associated with a transaction, such as the application of coupons, the award and/or redemption of loyalty rewards, etc. Additionally, in the event that the transaction is authorized, the transaction module 157 may invoke and/or request the invocation of a wide variety of VAS following the transaction, such as receipt delivery services, product registration services, etc. Indeed, a wide variety of suitable operations may be performed by the transaction module 157.

One example of the operations that may be performed by a transaction module 157 and/or the merchant computer 105 is described in greater detail below with reference to FIG. 2.

With continued reference to the merchant computer 105, the one or more I/O interfaces 152 may facilitate communication between the merchant computer 105 and one or more input/output devices; for example, one or more user interface devices, such as a display, a keypad, a mouse, a pointing device, a control panel, a touch screen display, a remote control, a microphone, a speaker, a consumer device reader, etc., that facilitate user interaction with the merchant computer 105. The one or more network interfaces 153 may facilitate connection of the merchant computer 105 to one or more suitable networks and/or communication links. In this regard, the merchant computer 105 may receive and/or communicate information to other components of the system 100, such as the consumer devices 110, the service provider systems 130, and/or the issuer systems 115.

Additionally, with continued reference to FIG. 1, any number of consumer devices 110 may be provided. Examples of suitable consumer devices 110 include, but are not limited to, personal computers 120 and/or mobile devices 125 (e.g., mobile phones, smart phones, etc.), etc. According to an aspect of the invention, a consumer device 110 may be a suitable device that is capable of interaction with other components of the system 100 during the request and/or completion of an eCommerce transaction. For example, a personal computer 120 or mobile device 125 may be utilized to access one or more eCommerce Web sites hosted by the merchant computer 105, identify products and/or services to be purchased, request a purchase transaction, and/or interact with the merchant computer 105 and/or other components of the system 100 (e.g., the service provider systems 130, etc.) during the completion of a purchase transaction. In one example embodiment, a mobile device 125 may be utilized to request a card present eCommerce transaction and/or to provide validation information during the processing of the eCommerce transaction. In another example embodiment, a personal computer 120 may be utilized to request a card present eCommerce transaction, and communication may be established with a mobile device 125 in order to facilitate provision of validation information.

As desired, a consumer device 110 may include any number of processor-driven devices, including but not limited to, a personal computer, a mobile computer, an application-specific circuit, a minicomputer, a microcontroller, and/or any other processor-based device. The components of an example mobile device 125 will now be described in greater detail, and it will be appreciated that a personal computer 120 may include similar components. With reference to the mobile device 125, the mobile device 125 may utilize one or more processors 160 to execute computer-readable instructions that facilitate the general operation of the mobile device 125 (e.g., call functionality, etc.) and/or communication with a merchant computer 105 and/or other components of the system 100 (e.g., the service provider systems 130) for eCommerce and/or payment transaction purposes. As a result of executing these computer-readable instructions, a special purpose computer or particular machine may be formed that facilitates the completion of card present eCommerce transactions.

In addition to having one or more processors 160, the mobile device 125 may further include and/or be associated with one or more memory devices 161, input/output ("I/O") interface(s) 162, and/or network interface(s) 163. The memory 161 may be any computer-readable medium, coupled to the processor(s) 160, such as random access memory ("RAM"), read-only memory ("ROM"), and/or a removable storage devices. The memory 161 may store a wide variety of data files 164 and/or various program modules, such as an operating system ("OS") 165 and/or one or more transaction modules or applications 167. In certain embodiments, a mobile device 125 may include one or more secure elements 166 configured to securely store and/or access information, such as payment applications, payment account information, validation information (e.g., a stored mPIN, etc.), encryption information, and/or other transaction-related information. The secure elements 166 may be stored in the memory 161 and/or included as a separate component of the mobile device 125. For example, a secure element 166 may be a separate chip that is configured to communicate with primary computing functionality for the mobile device 125. As desired, one or more of the transaction modules 167 may be stored on a secure element 166. These transaction modules 167 may be invoked by other components of the mobile device 125 and/or by one or more other components of the system 100, such as the merchant computer 105 and/or the service provider systems 130.

The data files 164 may include any suitable data that facilitates the operation of the mobile device 125 and/or interaction of the mobile device 125 with one or more other components (e.g., a merchant computer 105, a service provider system 130, etc.) of the system 100. For example, the data files 164 may include information associated with accessing the secure elements 166, information associated with invoking transaction modules 167, and/or information associated with accessing and/or processing validation data (e.g., an mPIN, etc.). The OS 165 may be a suitable module that facilitates the general operation of the mobile device 125, as well as the execution of other program modules. For example, the OS 165 may be, but is not limited to, a suitable mobile OS or a specially designed operating system. As desired, the mobile device 125 may also include one or more suitable browser applications that facilitate the access of one or more Web pages hosted by the merchant computer 105.

The transaction modules 167 may include one or more suitable software modules and/or applications configured to facilitate payment transactions, such as card present eCommerce transactions, on behalf of the mobile device 125. In certain embodiments, a transaction module 167 may also facilitate communication with a service provider system 130, such as a trusted service manager. A wide variety of suitable techniques may be utilized to install a transaction module 167 on the mobile device 125. For example, a transaction module 167 may be provisioned to the mobile device 125 by a service provider system 130 and/or by an issuer system 115. Additionally, during the installation and/or registration of the transaction module 167, a wide variety of validation information may be generated and/or identified. For example, the consumer may be prompted to enter an mPIN, such as a multi-character and/or multi-numeral code. As desired, the mPIN may be stored on a secure element 166. Additionally, the mPIN and/or a wide variety of information derived from the mPIN (e.g., an encrypted mPIN, etc.) may be provided to one or more issuer systems 115, such as an issuer system 115 associated with an issuer of a payment account (e.g., a credit account, a debit account, a stored value account, etc.) that is associated with the transaction module 167.

According to an aspect of the invention, following registration and/or activation of the transaction module 167, the transaction module 167 may be invoked during an eCommerce transaction. For example, the transaction module 167 may be invoked by a merchant computer 105 or by a service provider system 130 at the request of the merchant computer 105. In certain embodiments, the transaction module 167 may be invoked following a consumer request to conduct a card present eCommerce transaction and the identification of the mobile device 125 by the merchant computer 105 (or service provider system 130). Following the invocation of the transaction module 167, a request for validation data and/or payment account data may be received. As desired, the transaction module 167 may prompt the consumer for entry of an mPIN, and an mPIN value entered by the consumer (e.g., by a keypad, touchscreen, etc.) may be identified. A stored mPIN value may then be accessed from the secure element 166 and compared to the entered mPIN value. In this regard, the entered mPIN value may be authenticated. If the entered mPIN value is not authenticated, then the transaction module 167 may reject a proposed transaction and direct the output of a suitable error message.

If, however, the entered mPIN value is authenticated, then the transaction module 167 may provide payment account data and associated validation data to the merchant computer 105 (or a service provider system 130). A wide variety of different types of validation data may be provided as desired in various embodiments, including but not limited to, an mPIN entered by the consumer, an indication that the entered mPIN was authenticated by the mobile device 125 and/or the secure element 166, an encrypted version of the entered mPIN, and/or an encrypted version of the stored mPIN. In one example embodiment, an entered mPIN may be authenticated, encrypted, and provided to the merchant computer 105 (or a service provider system 130). In this regard, the encrypted mPIN may be provided to the issuer system 115 for authentication and/or risk analysis purposes.

One example of the operations of the transaction module 167 and/or the mobile device 125 is described in greater detail below with reference to FIG. 3.

The one or more I/O interfaces 162 may facilitate communication between the mobile device 125 and one or more input/output devices; for example, one or more user interface devices, such as a display, a keypad, a touch screen display, a microphone, a speaker, etc., that facilitate user interaction with the mobile device 125. The one or more network interfaces 163 may facilitate connection of the mobile device 125 to one or more suitable networks, for example, the network(s) 135 illustrated in FIG. 1. In this regard, the mobile device 125 may receive and/or communicate information to other components of the system 100.

With continued reference to FIG. 1, as desired in various embodiments, any number of issuer and/or financial institution systems 115 may be provided. An issuer system 115 may facilitate the backend processing of a proposed transaction, such as a proposed card present eCommerce transaction. For example, an issuer system 115 may facilitate the approval, authentication, and/or settlement of a proposed transaction. In certain embodiments, a proposed transaction may be routed to an issuer system 115 via a suitable transaction network 140 (e.g., a debit network, a credit network, etc.), and the issuer system 115 may evaluate the proposed transaction. An approval or rejection of the proposed transaction may then be output for communication to a merchant computer 105. The issuer system 115 may then facilitate the settlement of the proposed transaction. In certain embodiments, an issuer system 115 may include similar components as those discussed above for the merchant computer 105. For example, an issuer system 115 may include any number of processors, memories, I/O interfaces, and/or network interfaces.

According to an aspect of the invention, an issuer system 115 may receive validation information in association with a proposed eCommerce transaction. For example, the issuer system 115 may receive an encrypted mPIN and/or data derived from an mPIN (e.g., a dynamic hash of the mPIN, etc.). In other words, the mPIN may not be communicated in the clear to the issuer system 115. The issuer system 115 may compare at least a portion of the received validation information to information previously stored by the issuer system 115, such as an mPIN stored during the registration and/or activation of a transaction module 167. In this regard, the issuer system 115 may determine whether to authenticate a proposed eCommerce transaction and/or whether to permit the proposed transaction to be processed as a card present transaction. In certain embodiments, the evaluation of received validation information may determine both that a correct mPIN was entered by a consumer and validated by the secure element 166 and that correct validation information (e.g., an encrypted mPIN) was output by the mobile device 125. In this regard, strong dynamic two-factor authentication may be performed by the issuer system 115. This authentication may provide comparable security to that provided at brick-and-mortar or physical merchant locations. Additionally, in certain embodiments, this authentication can be reused for a wide variety of Federated Authentication purposes.

With continued reference to FIG. 1, any number of service provider systems 130 and/or service provider computers may be utilized as desired in various embodiments of the invention. As desired, a service provider system 130 may provide a wide variety of transaction module provisioning services. Additionally, a service provider system 130 may provide a wide variety of transaction-related and/or value added services ("VAS") in association with transactions, such as coupon redemption services, loyalty services, location-based services, electronic receipt services, product registration services, warranty services, coupon issuance services, and/or the routing of a proposed transaction to an issuer for approval and/or settlement purposes. In certain embodiments, a service provider system 130 may include similar components as those discussed above for the merchant computer 105. For example, a service provider system 130 may include any number of processors, memories, I/O interfaces, and/or network interfaces.

A wide variety of suitable networks 135, 140 may be utilized in association with embodiments of the invention. Certain networks 135 may facilitate a wide variety of eCommerce-related communication. For example, one or more telecommunication networks, cellular networks, wide area networks (e.g., the Internet), and/or other networks may be provided. Other networks may facilitate communication of transaction-related communications. For example, one or more transaction networks 140, such as branded networks (e.g., a VISA network, etc.), debit and/or PIN networks, and/or a wide variety of other suitable transaction networks may facilitate communication of transaction-related communications, such as proposed eCommerce transactions. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the invention should not be construed as being limited to any particular operating environment, system architecture, or device configuration.

Operational Overview

Figure 2:
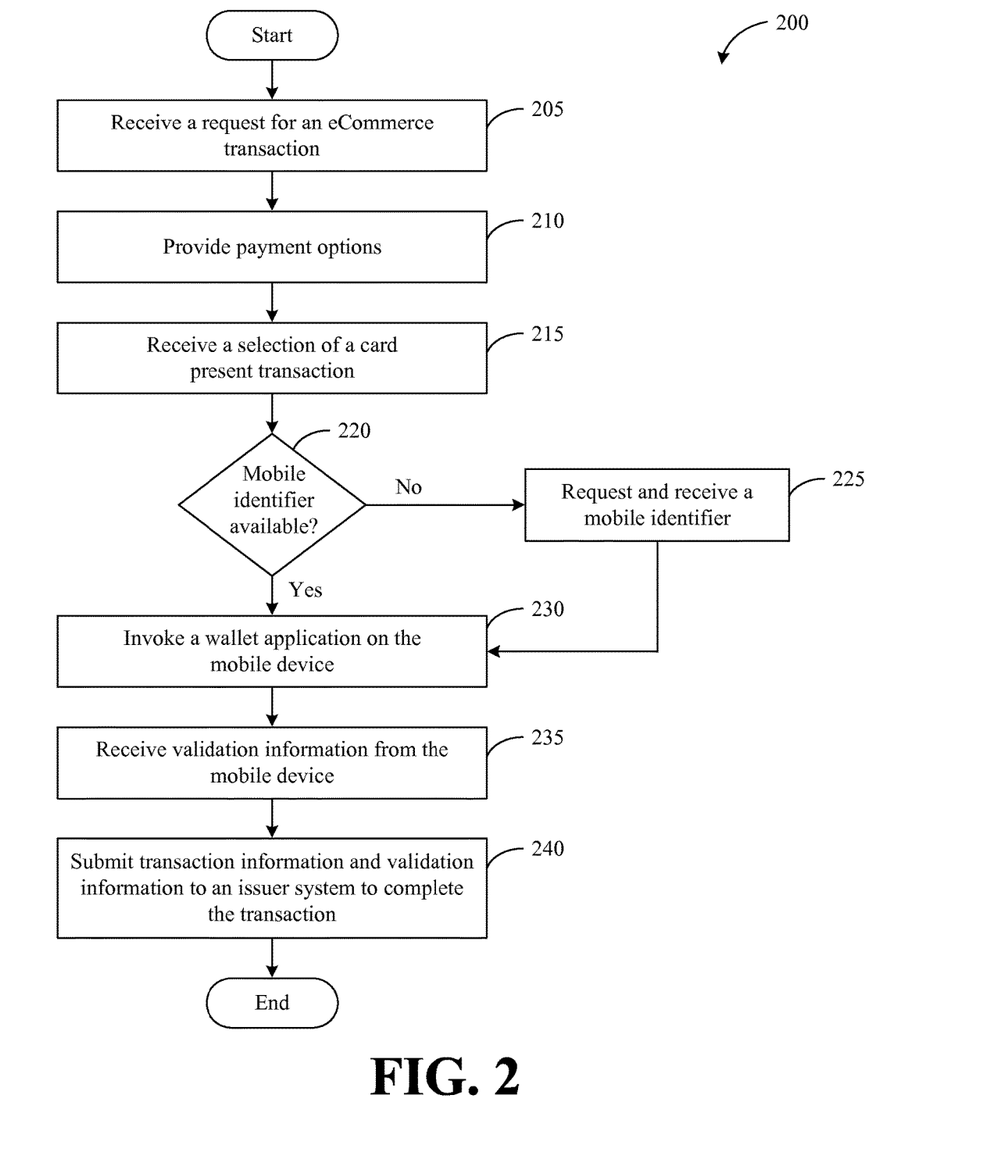
FIG. 2 illustrates a flow diagram of an example process for facilitating a card present eCommerce transaction at a merchant system, according to an example embodiment of the invention.

FIG. 2 illustrates a flow diagram of an example method 200 for facilitating a card present eCommerce transaction at a merchant system, according to an example embodiment of the invention. In certain embodiments, the operations of the method 200 may be performed by a suitable merchant computer, such as the merchant computer 105 illustrated in FIG. 1. The method 200 may begin at block 205.

At block 205, a request for an eCommerce transaction may be received 205. For example, a consumer may utilize a consumer device 110, such as a personal computer 120 or a mobile device 125, to navigate through one or more Web pages associated with the merchant computer 105, and the consumer may select one or more products and/or services to purchase. The consumer may then select an available option for requesting an eCommerce transaction. For example, the consumer may select a suitable "checkout" option provided by the one or more Web pages.

At block 210, one or more payment options may be identified by the merchant computer 105 and provided or communicated to the consumer device 110 for presentation to the consumer. A wide variety of suitable payment options may be identified and provided as desired in various embodiments of the invention, such as indications of supported payment networks (e.g., credit networks, debit networks, etc.) and/or indications of supported payment devices and/or payment accounts (e.g., credit accounts, debit accounts, stored value accounts, etc.). According to an aspect of the invention, at least one option for a card present payment may be identified and provided. For example, an option to utilize a mobile device 125 and/or an associated transaction module 167 to complete a card present eCommerce transaction may be identified and provided.

At block 215, a consumer selection of a desired payment option may be received from the consumer device 110. According to an aspect of the invention, the consumer selection may be a selection for a card present transaction. At block 220, a determination may be made as to whether a mobile device identifier, such as a telephone number of a mobile device 125, is available. In embodiments in which the consumer utilizes a mobile device 125 to request an eCommerce transaction, a mobile device identifier may be pulled from the mobile device 125. In embodiments in which the consumer utilizes another consumer device 110, such as a personal computer 120 to request an eCommerce transaction, a request for a mobile device identifier may be communicated to the consumer device 110, and the mobile device identifier may be received in response to the request. If it is determined at block 220 that a mobile device identifier is not available, then operations may continue at block 225, and a request for a mobile device identifier may be communicated to the consumer device 110. For example, a suitable Web page or other graphical user interface may prompt the consumer to enter a mobile telephone number in order to complete a card present transaction. The mobile device identifier may then be received in response to the request, and operations may continue at block 230. If, however, it is determined at block 220 that a mobile device identifier is available, then operations may continue at block 230.

In certain embodiments, determining whether a mobile device identifier is available can, instead, be replaced with functionality to establish or otherwise determine the connectivity of a transaction module, such as 157, with a particular mobile device, such as 125. This may be established by: a) the transaction module 157 displaying a transaction ID (e.g. in text or as a bar code) and the mobile device 125 can be used to capture that identifier and communicate validation information back from the mobile device 125 to the transaction module 157 via a service provider system, such as 130; and/or b) both a transaction module, such as 157, and mobile device, such as 125, can use a service provider system, such as 130, as a "meet in the middle"-type service to connect the mobile device with the corresponding transaction for conveyance of the validation information.

In any instance, at block 230, which may be reached from either block 220 or block 225, a suitable wallet application or transaction module may be invoked on the mobile device 125. For example, a transaction module associated with a desired payment account may be invoked. In certain embodiments, the merchant computer 105 may invoke the transaction module. In other embodiments, the merchant computer 105 may direct or request another device or system, such as a suitable service provider system 130, to invoke the transaction module. During the invocation of the transaction module, a wide variety of different types of validation information may be requested from the mobile device 125, such as a value derived from an mPIN (e.g., an encrypted mPIN, a dynamic hash value derived from an mPIN, etc.).

At block 235, validation information and payment account information may be received from the mobile device 125. The received information may then be utilized at block 240 to generate and/or submit a proposed transaction to an issuer system, such as the issuer system 115 illustrated in FIG. 1. In certain embodiments, a wide variety of transaction-related information, such as a purchase amount, payment account information, a request for a card present transaction, and/or validation information may be included in a proposed transaction. Additionally, in certain embodiments, a proposed transaction or a transaction request may be routed to an issuer system 115 via one or more other systems, such as a service provider system 130 or a merchant acquiring platform. Further, in certain embodiments, one or more requests for VAS may be generated by the merchant computer 105 and communicated to a service provider system 130 for processing.

The method 200 may end following block 240.

Figure 3:
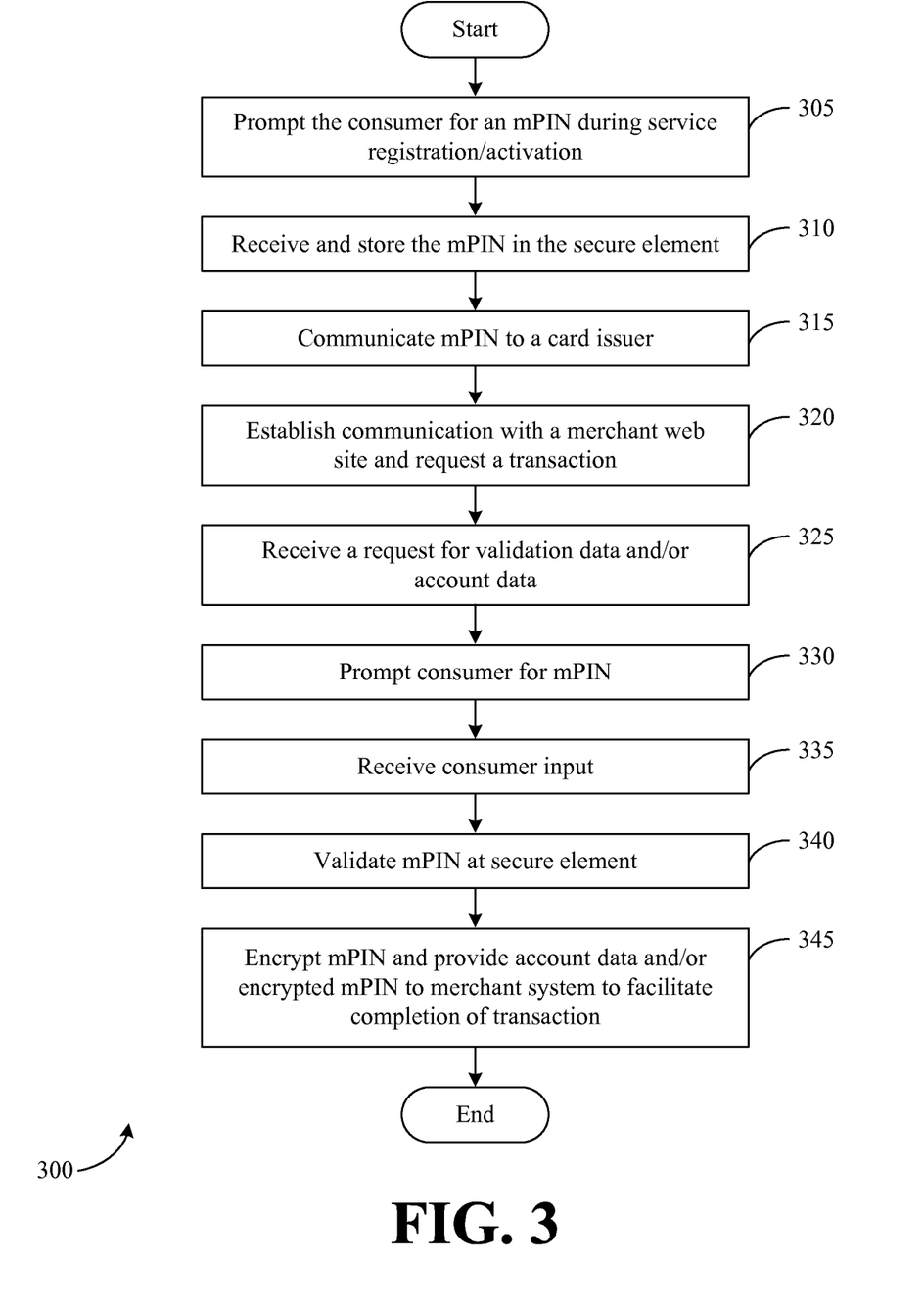
FIG. 3 illustrates a flow diagram of an example process for completing a card present eCommerce transaction utilizing a consumer device, according to an example embodiment of the invention.

FIG. 3 illustrates a flow diagram of an example method 300 for completing a card present eCommerce transaction utilizing a consumer device, according to an example embodiment of the invention. In certain embodiments, the operations of the method 300 may be performed by one or more suitable consumer devices, such as the consumer devices 110 illustrated in FIG. 1. The method 300 may begin at block 305.

At block 305, a payment application or other suitable transaction-related application may be provided to a mobile device of a consumer, such as the mobile device 125 illustrated in FIG. 1. For example, a payment application or mobile wallet application may be provisioned to the mobile device 125 by a payment account issuer (e.g., an issuer of a payment account associated with the application, etc.), a trusted service manager, or another suitable service provider. As desired, the application may be stored on a secure element of the mobile device 125. Additionally, the application may be activated and/or registered by the mobile device 125 in order to facilitate use of the application in subsequent transactions, such as subsequent card present transactions. For example, the application may be registered with a payment account issuer or with another service provider.

During the registration, the consumer may be prompted to enter or otherwise provide security and/or validation information, such as an mPIN. At block 310, an mPIN (and/or other security information) may be entered by the consumer and received by the mobile device 125. In certain embodiments, the received mPIN may be stored in a secure element of the mobile device 125 for use in subsequent transaction authentications. Additionally, at block 315, the mPIN and/or a value derived from the mPIN (e.g., an encrypted mPIN, a dynamic hash of the mPIN, etc.) may be output by the mobile device 125 for communication to one or more payment account issuers associated with the payment application. In this regard, an issuer may store the mPIN-related information for use in subsequent transaction authentications.

At block 320, the consumer may utilize a suitable consumer device 110, such as the mobile device 125, a personal computer 120, or another consumer device, to establish communication with a merchant Web site and to request a transaction. For example, a consumer device 110 may be utilized to navigate one or more Web pages hosted by a merchant computer 105, to select products and/or services to be purchased, and to request a purchase transaction associated with the selected items. As explained in greater detail above with reference to FIG. 2, the consumer may request a card present transaction and identification information for the mobile device 125 may be identified by the merchant computer 105 in association with the requested card present transaction.

At block 325, the payment application stored on the mobile device 125 may be invoked, and a request for validation data and/or payment account data may be received. For example, the payment application may be invoked by the merchant computer 105 or by a suitable service provider system. Based at least in part upon the received request for validation data, at block 330, the mobile device 125 may prompt the consumer to enter an mPIN. The consumer may utilize one or more suitable input devices associated with the mobile device 125 (e.g., a touchpad, a touchscreen, etc.) to enter an mPIN, and the received consumer input for the mPIN may be received by the mobile device 125 at block 335.

At block 340, the received or entered mPIN may be validated by the mobile device 125. For example, the received mPIN may be compared to an mPIN value stored on a secure element of the mobile device 125. In the event that a correspondence is identified, the received mPIN may be validated by the mobile device 125 and/or the secure element. Accordingly, the mobile device 125 may determine that the consumer is authorized to request a card present payment transaction utilizing the payment application.

At block 345, validation information to be output may be prepared by the mobile device 125 and/or secure element. For example, an encrypted mPIN, a dynamic hash value derived from the mPIN, and/or another value derived from the mPIN may be prepared. The validation information and payment account data may then be provided to the merchant computer 105 (or a service provider system) in order to facilitate completion of a card present transaction. In this regard, a proposed transaction or a transaction request may be routed to an issuer system 115 at the request of the merchant computer 105 or one or more other systems, such as a service provider system. According to an aspect of the invention, the proposed transaction may include or otherwise be associated with the validation information output by the mobile device 125.

An issuer to which the proposed transaction is communicated may compare at least a portion of the validation information to information previously stored by the issuer, such as an mPIN stored during the registration and/or activation of a payment application. In this regard, the issuer may determine whether to authenticate a proposed card present eCommerce transaction. In certain embodiments, the evaluation of received validation information may determine both that a correct mPIN was entered by a consumer and validated by the secure element and that correct validation information (e.g., an encrypted mPIN) was output by the mobile device 125. In this regard, strong dynamic two-factor authentication may be performed by the issuer.

The method 300 may end following block 345.

The operations described and shown in the methods 200, 300 of FIGS. 2-3 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-3 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A computer-implemented method for securing card present electronic commerce transactions, the method comprising:

receiving, by a merchant system comprising one or more computers, a request to conduct a card present transaction from a mobile communication device;

identifying, by the merchant system, the request as a card present transaction based on a comparison of a stored mobile device number or identifier, with a mobile device number or identifier associated with the mobile communication device;

receiving, by the merchant system, payment account and validation information from the mobile communication device, wherein the validation information is based at least in part on comparing a consumer mPIN (mobile personal identification number) value input by the user of the mobile communication device with a mPIN value stored on a secure element of the mobile communication device; and communicating, by the merchant system, the request for the purchase transaction to an issuer system, wherein the request is for a card present electronic commerce transaction, and the validation information is transmitted to the issuer system for comparison with previously stored issuer information comprising a mPIN value stored during a consumer registration process or an activation of a payment application stored on the mobile communication device.

2. The computer-implemented method of claim 1, wherein obtaining validation information comprises obtaining information derived from a consumer mPIN (mobile personal identification number) stored on the mobile device.

3. The computer-implemented method of claim 2, wherein the validation information comprises an encrypted mPIN value or data derived from the consumer mPIN (mobile personal identification number) value.

4. The computer-implemented method of claim 1, wherein the validation information comprises an encrypted mPIN value or data derived from the consumer mPIN (mobile personal identification number) value.

5. The computer-implemented method of claim 1, wherein the identifying, by the merchant system, the request as a card present transaction based on a comparison of a stored mobile device number or identifier, with a mobile device number or identifier associated with the mobile communication device, further comprises outputting, by the merchant system, a transaction ID for capture by the mobile communication device, and receiving, by the merchant system, transaction ID validation information based at least in part on capture of the transaction ID by the mobile communication device.

6. The computer-implemented method of claim 5, wherein the transaction ID comprises text or a bar code.

7. A computer-implemented method for securing card present electronic commerce transactions, the method comprising:
   receiving, by a merchant system comprising one or more computers, a request to conduct a card present transaction from a mobile communication device;
   identifying, by the merchant system, the request as a card present transaction based on a comparison of a stored mobile device number or identifier, with a mobile device number or identifier associated with the mobile communication device;
   invoking, by the merchant system, a transaction module stored on the mobile communication device, wherein the transaction module prompts entry of a consumer mPIN (mobile personal identification number) value to the mobile communication device;
   receiving, by the merchant system, payment account and validation information from the mobile communication device, wherein the validation information is based at least in part on comparing the consumer mPIN value input to the mobile communication device with a mPIN value stored on a secure element of the mobile communication device;
   receiving, by the mobile communication device, an identifier for the merchant system and the card present transaction;
   communicating, by the merchant system, the request for the purchase transaction to an issuer system, wherein the request is for a card present electronic commerce transaction, and the validation information is transmitted to the issuer system for comparison with previously stored issuer information comprising a mPIN value stored during a consumer registration process or an activation of the transaction module stored on the mobile communication device; and
   receiving, by the merchant system, authorization from the issuer system to proceed with the card present transaction.

8. The computer-implemented method of claim 7, wherein the validation information comprises an encrypted mPIN value or data derived from the consumer mPIN (mobile personal identification number) value.

9. The computer-implemented method of claim 7, wherein the identifying, by the merchant system, the request as a card present transaction based on a comparison of a stored mobile device number or identifier, with a mobile device number or identifier associated with the mobile communication device, further comprises outputting, by the merchant system, a transaction ID for capture by the mobile communication device, and receiving, by the merchant system, transaction ID validation information based at least in part on capture of the transaction ID by the mobile communication device.

10. The computer-implemented method of claim 9, wherein the transaction ID comprises text or a bar code.

11. A computer-implemented method for securing card present electronic commerce transactions, the method comprising:
    receiving, by a merchant system comprising one or more computers, a request to conduct a card present electronic commerce transaction from a mobile communication device;
    identifying, by the merchant system, the request as a card present transaction based on a comparison of a stored mobile device number or identifier, with a mobile device number or identifier associated with the mobile communication device;
    receiving, by the merchant system, a mobile communication device identifier, the merchant system, and the card present transaction; and
    communicating, by the merchant system, the request for the purchase transaction to an issuer system, wherein the request is for a card present electronic commerce transaction, and the validation information is transmitted to the issuer system for comparison with previously stored issuer information comprising a mPIN value stored during a consumer registration process or an activation of the transaction module stored on the mobile communication device; and
    receiving, by the merchant system, authorization from the issuer system to proceed with the card present transaction.

12. The computer-implemented method of claim 11, wherein the identifying, by the merchant system, the request as a card present transaction based on a comparison of a stored mobile device number or identifier, with a mobile device number or identifier associated with the mobile communication device, further comprises outputting, by the merchant system, a transaction ID for capture by the mobile communication device, and receiving, by the merchant system, transaction ID validation information based at least in part on capture of the transaction ID by the mobile communication device.

13. The computer-implemented method of claim 12, wherein the transaction ID comprises text or a bar code.

* * * * *